(12) United States Patent
Thormaehlen (10) Patent No.: US 9,372,679 B2
(45) Date of Patent: Jun. 21, 2016

(54) METHOD AND SYSTEM FOR SOFTWARE DELIVERY SERVICE

(71) Applicant: Frederik Thormaehlen, Mannheim (DE)

(72) Inventor: Frederik Thormaehlen, Mannheim (DE)

(73) Assignee: SAP SE (DE)

( * ) Notice: Subject to any disclaimer, the term of this patent is extended or adjusted under 35 U.S.C. 154(b) by 26 days.

(21) Appl. No.: 13/958,023

(22) Filed: Aug. 2, 2013

(65) Prior Publication Data

US 2015/0040116 A1 Feb. 5, 2015

(51) Int. Cl.
*G06F 9/445* (2006.01)

(52) U.S. Cl.
CPC ... *G06F 8/60* (2013.01); *G06F 8/65* (2013.01)

(58) Field of Classification Search
CPC .................................... G06F 8/65; G06F 8/61
USPC ................................................ 717/172, 177
See application file for complete search history.

(56) References Cited

U.S. PATENT DOCUMENTS

| | | | | |
|---|---|---|---|---|
| 5,138,712 | A * | 8/1992 | Corbin | G06F 21/105 705/59 |
| 6,041,411 | A * | 3/2000 | Wyatt | G06F 21/10 380/27 |
| 6,347,398 | B1 * | 2/2002 | Parthasarathy et al. | 717/178 |
| 6,751,794 | B1 * | 6/2004 | McCaleb et al. | 717/168 |
| 6,952,822 | B2 * | 10/2005 | Shiobara et al. | 717/168 |
| 7,171,660 | B2 * | 1/2007 | McCaleb et al. | 717/171 |
| 7,702,536 | B1 * | 4/2010 | Alabraba | G06Q 30/02 705/14.16 |
| 7,770,165 | B2 * | 8/2010 | Olson et al. | 717/168 |
| 7,818,741 | B1 * | 10/2010 | Bourdev | G06F 21/105 717/174 |
| 7,853,943 | B2 * | 12/2010 | McCaleb et al. | 717/173 |
| 7,962,424 | B1 * | 6/2011 | Colosso | G06Q 30/06 380/201 |
| 8,069,242 | B2 | 11/2011 | Hadar et al. | |
| 8,126,963 | B1 * | 2/2012 | Rimmer | 709/203 |
| 8,141,071 | B2 * | 3/2012 | McCaleb et al. | 717/172 |
| 8,321,921 | B1 | 11/2012 | Ahmed et al. | |
| 8,375,130 | B2 | 2/2013 | Eberlein et al. | |
| 8,380,667 | B2 | 2/2013 | Driesen | |
| 8,392,573 | B2 | 3/2013 | Lehr et al. | |
| 8,392,908 | B2 | 3/2013 | Laicher et al. | |
| 8,407,683 | B2 * | 3/2013 | Cheng et al. | 717/168 |
| 8,412,673 | B2 | 4/2013 | Weissenberger et al. | |
| 8,429,410 | B2 * | 4/2013 | Little et al. | 713/175 |
| 8,612,773 | B2 * | 12/2013 | Nataraj et al. | 713/192 |
| 8,645,942 | B2 * | 2/2014 | Maj | 717/172 |
| 8,726,267 | B2 * | 5/2014 | Li et al. | 717/173 |
| 8,839,126 | B1 * | 9/2014 | Tang et al. | 715/764 |
| 2002/0100037 | A1 * | 7/2002 | Kitagawa | G06F 8/61 717/174 |
| 2004/0148229 | A1 * | 7/2004 | Maxwell | G06Q 30/0277 705/14.73 |
| 2005/0132348 | A1 * | 6/2005 | Meulemans et al. | 717/168 |
| 2006/0059480 | A1 * | 3/2006 | Kimoto | 717/172 |
| 2006/0143135 | A1 * | 6/2006 | Tucker | G06F 21/121 705/59 |

(Continued)

FOREIGN PATENT DOCUMENTS

| | | |
|---|---|---|
| EP | 1361509 | 11/2003 |
| WO | WO 2012/014220 | 2/2012 |
| WO | WO 2013/039555 | 3/2013 |

*Primary Examiner* — Phillip H Nguyen
(74) *Attorney, Agent, or Firm* — Sterne, Kessler, Goldstein & Fox P.L.L.C.

(57) ABSTRACT

Provided herein are techniques for distributing software. An embodiment operates by receiving a software product request including a unique identification information, verifying the unique identification information, and distributing a software product associated with the unique identification information in response to the request.

20 Claims, 4 Drawing Sheets

(56) References Cited

U.S. PATENT DOCUMENTS

| | | | |
|---|---|---|---|
| 2006/0184927 A1* | 8/2006 | Deblaquiere et al. | 717/168 |
| 2007/0299779 A1* | 12/2007 | Sung | G06F 21/121 705/51 |
| 2009/0327091 A1* | 12/2009 | Hartin | G06Q 30/0601 705/26.1 |
| 2010/0211508 A1 | 8/2010 | Livschitz et al. | |
| 2010/0250400 A1* | 9/2010 | Fernandez Gutierrez | G06Q 30/0603 705/26.1 |
| 2011/0066456 A1 | 3/2011 | Lu et al. | |
| 2011/0239210 A1* | 9/2011 | Kotani et al. | 717/171 |
| 2011/0296020 A1 | 12/2011 | Deng et al. | |
| 2012/0158821 A1 | 6/2012 | Barros | |
| 2013/0085810 A1 | 4/2013 | Driesen et al. | |

\* cited by examiner

METHOD AND SYSTEM FOR SOFTWARE DELIVERY SERVICE

BACKGROUND

Software vendors often sell and distribute software using a vendor-specific architecture. For example, a software vendor may provide an online/internet store to process payment of a particular software package and, upon payment confirmation, direct the user to a download area for delivery of the particular software package. The software vendor, therefore, maintains the software package's vending system as well as its storage and distribution system.

When these software vendors offer software packages from multiple software companies, integration of the software packages into the software vendor's system is necessary. Such integration of software packages may require uploading the new software packages into the vendor's storage space, maintaining the storage space, and in some cases integrating provider-specific interfaces into the vendor specific architecture. Maintaining such an architecture and integrating such software packages may be time consuming, complex, and costly, particularly when the software vendor carries hundreds of software packages.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are system, method and/or computer program product embodiments, and/or combinations and subcombinations thereof, for distributing software.

Conventionally, a software vendor distributes software to its clients by providing the software in a compact disk or other physical media format, or by making the software available for download from a vendor's monolith system (i.e., processing of the sale and distribution of software are performed within the same system). In various exemplary embodiments of the present disclosure, a software vendor distributes a software product by providing a client with identification information for uniquely identifying the software product. The client obtains the software product by download from a separate software delivery service system using the identification information. The identification information may include an identification of the software, a digital signature, and entitlement certificate, or some other identification and/or authentication information, as will be explained in further detail below. This obviates, at least, the need for the vendor to store and maintain the software in its own memory space. This may also simplify integration of multiple software product offerings by only requiring integration of the product's offering, not of their distribution.

Figure 1:
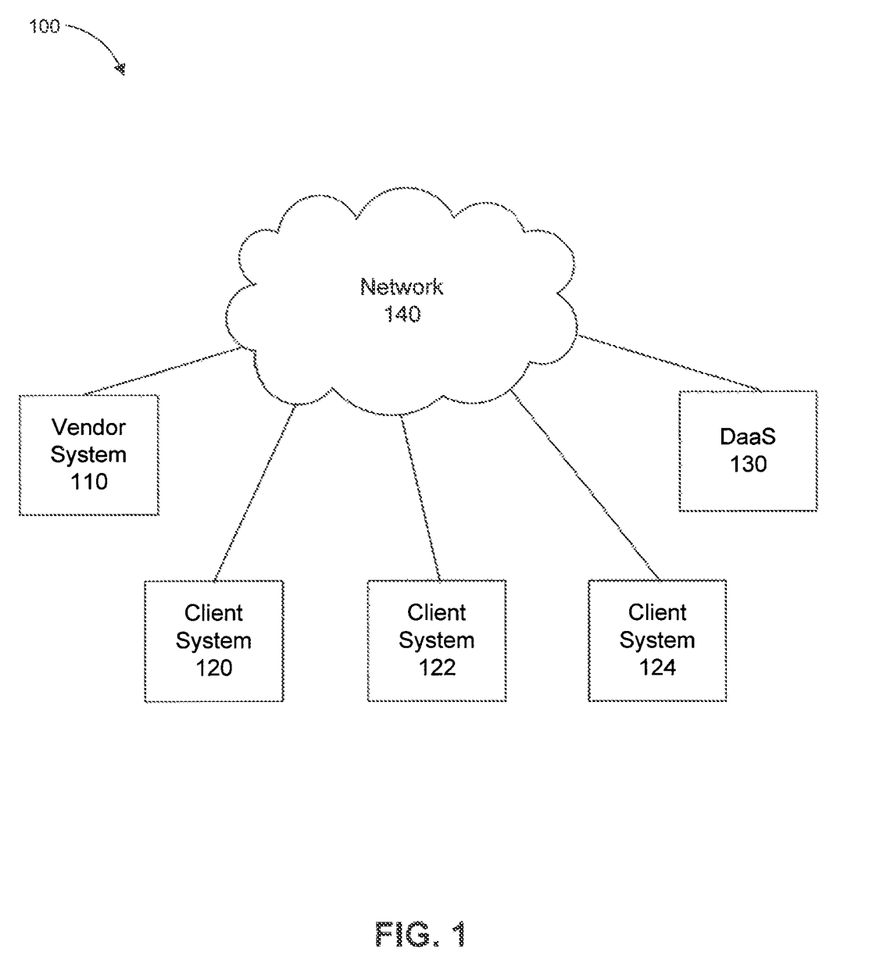
FIG. 1 is a block diagram of a system for distributing software, according to an example embodiment.

FIG. 1 illustrates an environment 100 according to various exemplary embodiments of the present disclosure. Environment 100 includes a software vendor system 110, client systems 120-124, a delivery as a service (DaaS) system 130, and a communication network 140.

A software vendor system 110 offers a plurality of software products to clients, such as clients 120-124, through network 140. Software vendor 110 may include an online/internet retail outlet for software produced internally, by affiliated software companies, or third-party software companies, without departing from the scope of the disclosure. Software vendor system 110 may offer the software products and process their sale. Although only one software vendor system is illustrated, those of ordinary skill in the art would understand that environment 100 may include multiple software vendors systems offering software products to clients, such as clients 120-124, without departing from the scope of the present disclosure.

Client systems 120-124 may include any system configured to communicate with other systems, such as a personal computer, laptop, tablet, mobile device, computer server, etc., directly or through a communication network. In various exemplary embodiments of the present disclosure, client systems 120-124 may use network 140 to communicate with software vendor 110 to purchase software products and with DaaS system 130 to receive the purchased software products.

DaaS system 130 may be a server, including a processor and a memory device, for storing a plurality of software packages, receiving requests for at least one of such software packages, and for distributing the requested software package(s) according to various aspects of the present disclosure.

Network 140 is a communications network, such as a LAN, a WAN, the internet, or a combination thereof, for supporting communications between client systems, such as software vendor 110, client systems 120-124, and DaaS system 130.

Figure 2:
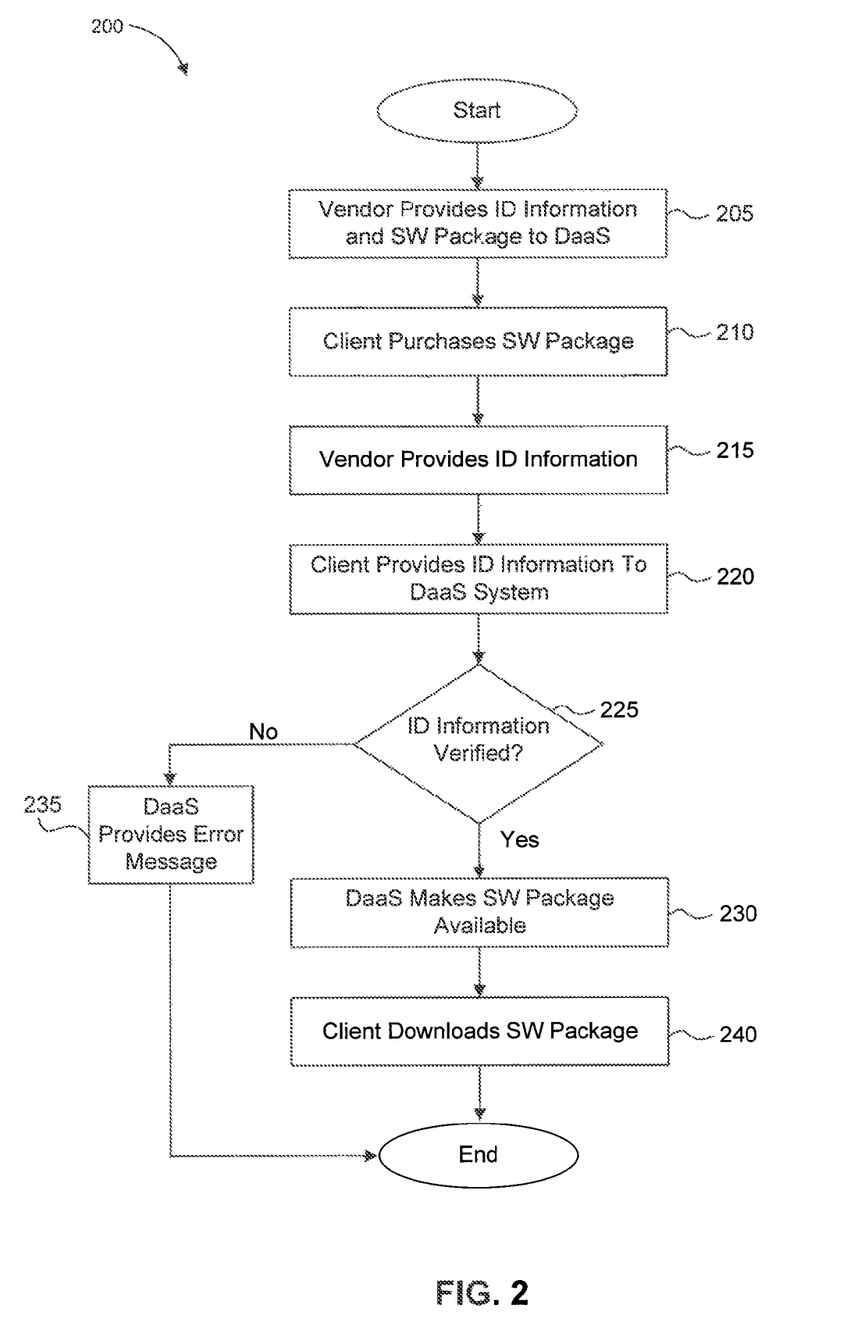
FIG. 2 is a flowchart illustrating a process for distributing software, according to an example embodiment.

FIG. 2 is a flowchart illustrating a method for distributing software according to an exemplary embodiment of the present teachings. The flowchart is described with continued reference to the embodiment of FIG. 1. However, the flowchart is not limited to that embodiment.

At step 205, a software vendor, such as software vendor 110, and a DaaS system, such as DaaS system 130, exchange data associated with the offer and distribution of a software package. In particular, the software vendor may provide the DaaS system with a software package it sells and unique identification information associated with the software package. The unique identification information may include an identification of the software package, a digital signature, and entitlement certificate, or some other information necessary to identify the software package and to verify that the client is authorized to receive the software package. The unique identification information may further include a link to a DaaS system from which the client may download the software package. The unique identification information may be embodied in an XML file including some or all of the elements above. The software vendor communicates with the DaaS system through a network, such as network 140.

At step 210, a client system, such as client system 120, communicates with the software vendor to select and pay for the software package. The client communicates with the software vendor through the network. A person of ordinary skill in the art would understand that this network may be different than the network used to provide the software package to the DaaS system.

At step 215, the client system receives from the vendor the unique identification information associated with the software package in response to the sale. A person of ordinary skill in the art would understand that instead of providing the unique identification information the vendor system may provide data associated with the unique identification information without departing from the scope of the present disclosure. For example, the vendor system may provide the client system a digitally-signed and/or encrypted message that may be verified for authenticity by the DaaS system using the unique identification information exchanged at step 205 between the vendor system and the DaaS system.

At step 220, the client system communicates with a DaaS system, such as DaaS system 130, through a network, such as network 140, to obtain the software package. In particular, the client system further provides the unique identification information received from the vendor system to the DaaS system. The particular information provided by the client depends on the implementation, and may include some or all of the elements in the unique identification information. For example, if the unique identification information is embodied in an XML file, the client system may simply provide the XML file to the DaaS system to both identify the software package and to demonstrate authorization to receive the software package. In the alternative, the client system may only provide a unique identification of the software package provided in the unique identification information, and/or a digital signature provided in the unique identification information providing a unique association with the software package.

At step 225, the DaaS system verifies the information provided by the client. If the information matches a software package available for download and/or is positively authenticated (e.g., a digital signature is verified, the user has proper license to use the software, etc.), the DaaS system makes the software package available for download (step 230). If the information does not match software available for download or is not positively authenticated, the DaaS system returns an error message and does not make the software package available for download (step 235).

At step 240, the client system downloads the software package through the network.

Therefore, in the present exemplary embodiment, a software vendor provides a user with one or more software packages for purchase but, instead of providing the software package, provides unique identification information for downloading the software from a software delivery service system. This may obviate the need for the software vendor to, for example, store the software packages being offered, monitor and maintain proper space for all the software packages being offered, and monitor and maintain a software package delivery system, including providing a delivery interface and supporting related bandwidth requirements.

In the present exemplary embodiment, the client system purchases the software package from the vendor before it is able to download the software package. However, the present disclosure is not so limited, and a DaaS system may provide client systems with trial software package (i.e., a less functional version of the regular software package) without the need for specific identification information from the software vendor. For example, a client system may connect with the DaaS system and search, by name, for particular software based on, for example, an advertisement. The DaaS system may then provide a trial version to the client system. If the client system wishes to upgrade to the regular software package, the client system will then connect to the vendor to obtain identification information for the regular software package, and the software package is delivered as illustrated in FIG. 2. In such an exemplary embodiment, the software vendor will not need to store the trial software packages, monitor and maintain proper space for the trial software packages, or monitor and maintain a trial software package delivery system, including providing a delivery interface and supporting related bandwidth requirements.

Figure 3:
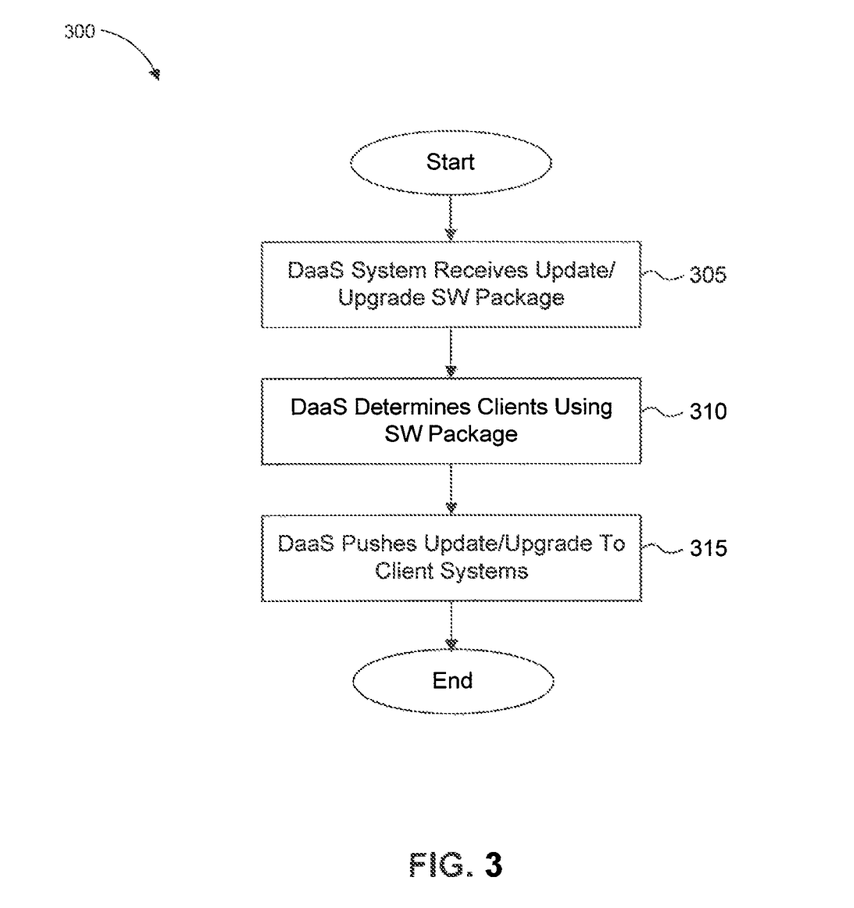
FIG. 3 is a flowchart illustrating a process for distributing software, according to another example embodiment.

FIG. 3 is a flowchart illustrating a method for distributing software according to another exemplary embodiment of the present teachings. The flowchart is described with continued reference to the embodiment of FIG. 1. However, the flowchart is not limited to that embodiment.

At step 305, a DaaS system, such as DaaS system 130, receives an update for a software package available for distribution through the DaaS system. The update may be received from a software vendor system, such as software vendor system 110, or from a software company that develops and/or maintains the particular software package.

At step 310, the DaaS system correlates the software package with client systems, such as client system 120, that have downloaded the particular software package.

At step 315, the DaaS system pushes the update into those client systems that have downloaded the particular software package. In particular, the DaaS system may use information gathered during distribution of the software package to establish a communication link with associated client systems and automatically load the update into the client system. In the alternative, the DaaS system may send a message to associated client systems informing the system about the update and instructing how to receive the update.

Therefore, in the present exemplary embodiment, a DaaS system updates a software package based on update information provided by the software vendor and/or the software company that develops and/or maintains the software package. This may obviate the need for the software vendor to, for example, monitor and maintain information as to which client services need to be updated for each of the offered software packages, and monitor and maintain a software package update delivery system. Furthermore, in cases where the update is provided directly by the software company that developed the software package, the software vendor may not need to be involved in the update process at all.

Although in the present embodiment updates are pushed into all client systems that have downloaded the software package from the DaaS system, the present disclosure is not so limited, and the DaaS may further check for terms of a contract between the client systems and the software vendor system or the software company regarding updates. For example, an agreement between a client system and a software vendor may call for delivery of updates for a limited period of time, in which case, the DaaS system will need to check that the contract between the client system and the software vendor/company has not expired before pushing the particular update to the client system.

Example Computer System

Figure 4:
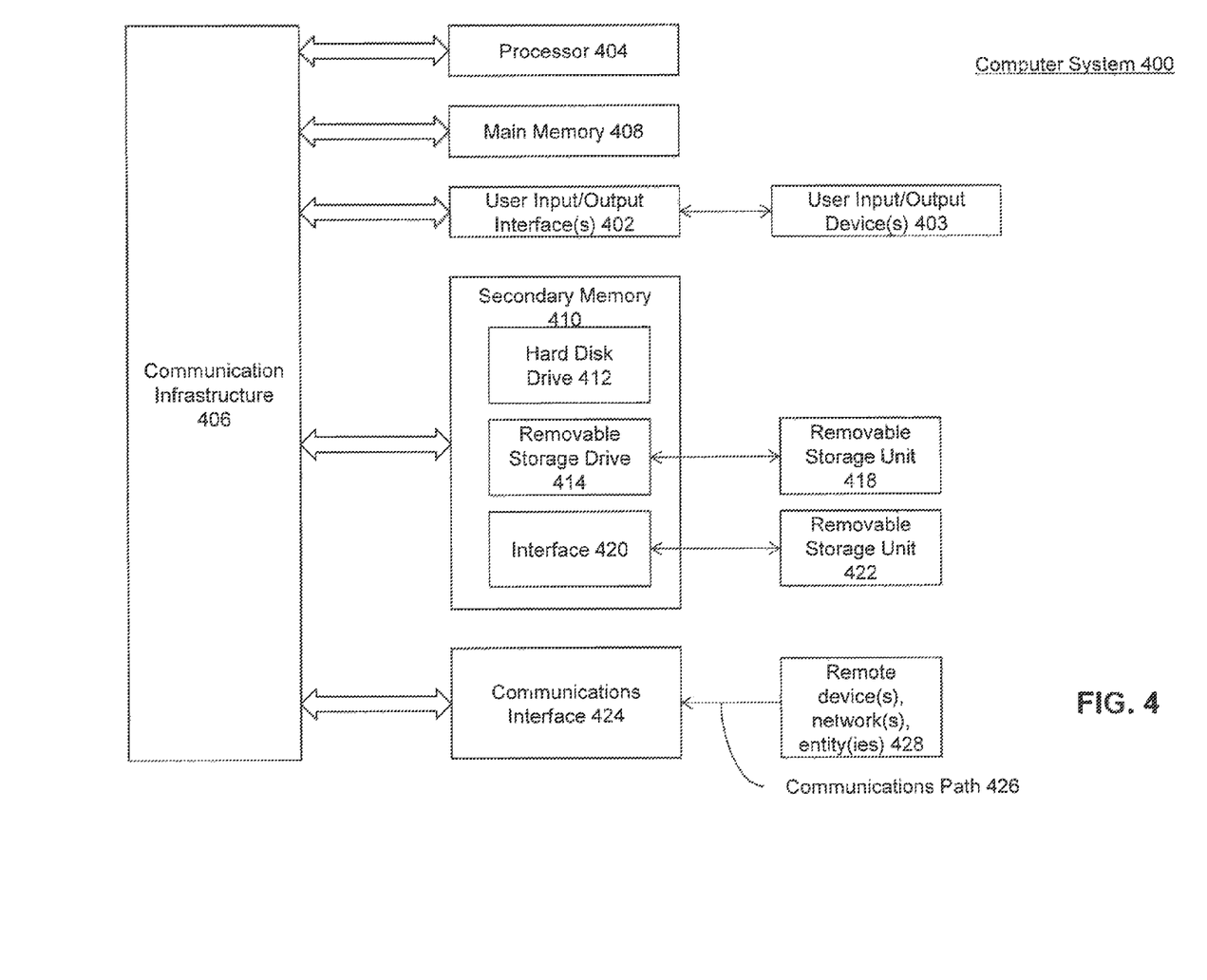
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the disclosure using data processing devices, computer systems and/or computer architectures other than that shown in FIG. 4. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method, comprising:

receiving, by a delivery as a service (DaaS) system including at least one processor, via a communication network, a software product and unique identification information from a software vendor that is separate from the DaaS system and that maintains an offering of the software product provided to a client system, wherein the unique identification information identifies the software product;

receiving, by the DaaS system from the client system, via the communication network, a request for downloading the software product, wherein the request comprises information associated with the unique identification information received by the client system in response to a purchase of the offering from the software vendor by the client system;

using, by the DaaS system, the unique identification information received from the software vendor to verify that the information from the request of the client system allows the software product to be distributed to the client system; and distributing, by the DaaS system, the software product to the client system in response to verifying the received request.

2. The method of claim 1, the using comprising:
processing a portion of the information using a digital signature algorithm.

3. The method of claim 1, the using comprising:
comparing a portion of the information to a list of codes associated with a plurality software products to determine that the software product is available for distribution.

4. The method of claim 1, further comprising:
receiving an identification of the client system included in the request; and
storing the identification of the client system in association with the software product in a list including a plurality of client system-software product associations, wherein the software product is identified by the unique identification information.

5. The method of claim 4, further comprising:
receiving, by the DaaS, an update to the software product from the software vendor or a software company that maintains the software package; and
distributing, in response to receipt of the update, the update to all client systems associated with the software product in the list.

6. The method of claim 4, further comprising:
receiving an update agreement between a plurality of client systems and the software product;
storing the update agreement in association with the software product in the list;
receiving an update to the software product; and
distributing, in response to receipt of the update, the update to the plurality of client systems associated with the software product based on the update agreement.

7. The method of claim 4, further comprising:
receiving an update agreement between the client system and the software product, wherein the request for downloading comprises the update agreement associated with the unique identification information;
storing the update agreement in association with the software product in the list;
receiving an update to the software product; and
distributing, in response to receipt of the update, the update to the client system associated with the software product based on the update agreement.

8. A delivery as a service (DaaS) system, comprising:
a memory; and
at least one processor coupled to the memory and configured to:
receive, via a communication network, a software product and unique identification information from a software vendor that is separate from the DaaS system and that maintains an offering of the software product provided to a client system, wherein the unique identification information identifies the software product;
receive from the client system, via the communication network, a request for downloading the software product, wherein the request comprises the information associated with the unique identification information received by the client system in response to a purchase of the offering from the software vendor by the client system;
using the unique identification information received from the software vendor to verify that the information from the request of the client system allows the software product to be distributed to the client system; and
distribute the software product in response to verifying the received request.

9. The system of claim 8, the at least one processor further configured to:
process a portion of the information using a digital signature algorithm.

10. The system of claim 8, the at least one processor further configured to:
compare a portion of the information to a list of codes associated with a plurality software products to determine that the software product is available for distribution.

11. The system of claim 8, the at least one processor further configured to:
receive an identification of the client system included in the request; and
store the identification of the client system in association with the software product in a the memory in a list including a plurality of client system-software product associations, wherein the software product is identified by the unique identification information.

12. The system of claim 11, the at least one processor further configured to:
receive an update to the software product from the software vendor or a software company that maintains the software package; and
distribute, in response to receipt of the update, the update to all client systems associated with the software product in the list.

13. The system of claim 11, the at least one processor further configured to:
receive an update agreement between a plurality of client systems and the software product;
store the update agreement in association with the software product in the list;
receive an update to the software product; and
distribute, in response to receipt of the update, the update to the plurality of client systems associated with the software product based on the update agreement.

14. The system of claim 11, the at least one processor further configured to:
receive an update agreement between the client system and the software product, wherein the request for downloading comprises the update agreement associated with the unique identification information;
store the update agreement in association with the software product in the list;
receive an update to the software product; and
distribute, in response to receipt of the update, the update to the client system associated with the software product based on the update agreement.

15. A non-transitory tangible computer-readable device having instructions stored thereon that, when executed by at least one computing device, causes the at least one computing device to perform operations comprising:
receiving, by a delivery as a service (DaaS) system including at least one processor, via a communication network, a software product and unique identification information from a software vendor that is separate from the DaaS system and that maintains an offering of the software product provided to a client system, wherein the unique identification information identifies the software product;

receiving, by the DaaS system from the client system, via the communication network, a request for downloading the software product, wherein the request comprises information associated with the unique identification information received by the client system in response to a purchase of the offering from the software vendor by the client system;

using, by the DaaS system, the unique identification information received from the software vendor to verify that the information from the request of the client system allows the software product to be distributed to the client system; and distributing, by the DaaS system, the software product to the client system in response to verifying the received request.

16. The computer-readable device of claim 15, the operations further comprising:

processing a portion of the information using a digital signature algorithm.

17. The computer-readable device of claim 15, the operations further comprising:

comparing a portion of the information to a list of codes associated with a plurality software products to determine that the software product is available for distribution.

18. The computer-readable device of claim 15, the operations further comprising:

receiving an identification of the client system included in the request; and storing the identification of the client system in association with the software product in a list including a plurality of client system-software product associations, wherein the software product is identified by the unique identification information.

19. The computer-readable device of claim 18, the operations further comprising:

receiving, by the DaaS, an update to the software product from the software vendor or a software company that maintains the software package; and distributing, in response to receipt of the update, the update to all client systems associated with the software product in the list.

20. The computer-readable device of claim 18, the operations further comprising:

receiving an update agreement between a plurality of client systems and the software product;

storing the update agreement in association with the software product in the list;

receiving an update to the software product;

distributing, in response to receipt of the update, the update to the plurality of client systems associated with the software product based on the update agreement.

* * * * *